(12) United States Patent
Zhang et al.

(10) Patent No.: US 10,054,459 B2
(45) Date of Patent: *Aug. 21, 2018

(54) ROUTE INFORMATION DISPLAYING METHOD AND APPARATUS

(71) Applicant: TENCENT TECHNOLOGY (SHENZHEN) COMPANY LIMITED, Shenzhen (CN)

(72) Inventors: Fei Zhang, Shenzhen (CN); Xian Zhang, Shenzen (CN); Hongying Jiang, Shenzhen (CN); Weizheng Li, Shenzhen (CN); Chengyu Liao, Shenzhen (CN); Song Meng, Shenzhen (CN); Yan Zhao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/866,260

(22) Filed: Jan. 9, 2018

(65) Prior Publication Data

US 2018/0128631 A1 May 10, 2018

Related U.S. Application Data

(63) Continuation of application No. 15/166,727, filed on May 27, 2016, now Pat. No. 9,897,458, which is a (Continued)

(30) Foreign Application Priority Data

Mar. 14, 2014 (CN) .......................... 2014-10096091

(51) Int. Cl.
*G01C 21/34* (2006.01)
*G01C 21/36* (2006.01)
(Continued)

(52) U.S. Cl.
CPC ...... *G01C 21/3492* (2013.01); *G01C 21/3694* (2013.01); *G01C 21/3697* (2013.01); *G01S 19/42* (2013.01); *G06T 19/003* (2013.01)

(58) Field of Classification Search
CPC ............ G01C 21/3492; G01C 21/3697; G01C 21/3694; G01S 19/42; G06T 19/003
See application file for complete search history.

(56) References Cited

U.S. PATENT DOCUMENTS 5,504,482 A 4/1996 Schreder
6,334,087 B1 12/2001 Nakano et al.
(Continued)

FOREIGN PATENT DOCUMENTS

CN 1521483 A 8/2004
CN 1896690 A 1/2007
(Continued)

*Primary Examiner* — Russell Frejd
(74) *Attorney, Agent, or Firm* — Anova Law Group, PLLC

(57) ABSTRACT

The present disclosure is applicable to the field of information technologies, and provides a route information displaying method and apparatus. The method includes: creating a three-dimensional coordinate system, and loading an electronic map in the XY plane of the three-dimensional coordinate system; acquiring, by using a satellite positioning system, a real-time location of a mobile terminal and a real-time speed, of the mobile terminal, corresponding to the real-time location; and drawing both a moving route and a speed curve of the mobile terminal in the three-dimensional coordinate system according to the acquired real-time location and real-time speed, where the real-time location of the mobile terminal is represented in the XY plane of the three-dimensional coordinate system, and the real-time speed of the mobile terminal is represented on the Z axis of the three-dimensional coordinate system.

18 Claims, 6 Drawing Sheets

Related U.S. Application Data continuation of application No. PCT/CN2015/074163, filed on Mar. 13, 2015.

(51) Int. Cl.
    *G01S 19/42*     (2010.01)
    *G06T 19/00*     (2011.01)

(56) References Cited

U.S. PATENT DOCUMENTS

| | | |
|---|---|---|
| 7,277,573 B1 | 10/2007 | O'Brien, Jr. |
| 9,007,461 B2 | 4/2015 | Ohtomo et al. |
| 9,345,972 B2 | 5/2016 | Nishida et al. |
| 2004/0148099 A1 | 7/2004 | Kim |
| 2005/0234638 A1 | 10/2005 | Ogaki et al. |
| 2012/0310530 A1 | 12/2012 | Lee |
| 2013/0204528 A1 | 8/2013 | Okude et al. |

FOREIGN PATENT DOCUMENTS

| | | |
|---|---|---|
| CN | 101334288 A | 12/2008 |
| CN | 101536056 A | 9/2009 |
| CN | 101968364 A | 2/2011 |
| CN | 102598083 A | 7/2012 |
| CN | 103348392 A | 10/2013 |
| CN | 103630142 A | 3/2014 |

ROUTE INFORMATION DISPLAYING METHOD AND APPARATUS

CROSS-REFERENCES TO RELATED APPLICATIONS

This application is a continuation application of U.S. patent application Ser. No. 15/166,727, filed on May 27, 2016 and granted on Feb. 20, 2018 with U.S. Pat. No. 9,897,458. U.S. patent application Ser. No. 15/166,727 is a continuation application of PCT Patent Application No. PCT/CN2015/074163, filed on Mar. 13, 2015, which claims priority to Chinese Patent Application No. 201410096091.3, entitled "A ROUTE INFORMATION DISPLAYING METHOD AND APPARATUS" filed on Mar. 14, 2014, the entire contents of all of which are incorporated herein by reference.

FIELD OF THE TECHNOLOGY

The present disclosure belongs to the field of information technologies, and in particular, to a route information displaying method and apparatus.

BACKGROUND OF THE DISCLOSURE

By combining electronic map technologies and satellite positioning systems, an intelligent terminal can record a route through which a user drives a car; and display the recorded route at a corresponding position of an electronic map, for the user to view the route conveniently.

However, an electronic map interface itself already includes abundant map information and has little space that can be used to display additional information; and therefore, currently, only a traveling track of the user can be marked in the electronic map; and traveling information related to the traveling track can be further viewed only by loading a new display page, or loading a floating window at a corresponding position of the traveling track. As a result, electronic map information and detailed traveling information cannot be comprehensively displayed simultaneously, which reduces the information acquisition efficiency.

SUMMARY

An objective of embodiments of the present invention is to provide a route information displaying method, to solve a problem in the existing technology that electronic map information and detailed traveling information cannot be comprehensively displayed simultaneously.

The embodiments of the present invention are implemented as follows: a route information displaying method includes: creating a three-dimensional coordinate system, and loading an electronic map in the XY plane of the three-dimensional coordinate system; acquiring, by using a satellite positioning system, a real-time location of a mobile terminal and a real-time speed of the mobile terminal corresponding to the real-time location; and drawing both a moving route and a speed curve of the mobile terminal in the three-dimensional coordinate system according to the real-time location and the real-time speed, the real-time location of the mobile terminal being represented in the XY plane of the three-dimensional coordinate system, and the real-time speed of the mobile terminal being represented on the Z axis of the three-dimensional coordinate system.

Another objective of the embodiments of the present invention is to provide a route information displaying apparatus, including: a creating unit, configured to create a three-dimensional coordinate system, and load an electronic map in the XY plane of the three-dimensional coordinate system; a first acquiring unit, configured to acquire, by using a satellite positioning system, a real-time location of a mobile terminal and a real-time speed of the mobile terminal corresponding to the real-time location; and a first drawing unit, configured to draw both a moving route and a speed curve of the mobile terminal in the three-dimensional coordinate system according to the real-time location and the real-time speed, the real-time location of the mobile terminal being represented in the XY plane of the three-dimensional coordinate system, and the real-time speed of the mobile terminal being represented on the Z axis of the three-dimensional coordinate system.

In the embodiments of the present invention, the amount of route information presented in an electronic map is expanded using a three-dimensional displaying manner, so as to comprehensively display detailed route information in the electronic map. Compared with a manner of displaying detailed route information by loading a new page or loading a floating window, the route information acquisition efficiency is effectively improved in the embodiments of the present invention.

DESCRIPTION OF EMBODIMENTS

In order to make the objectives, technical solutions, and advantages of the present disclosure more comprehensible, the present disclosure is described in further detail below with reference to accompanying drawings and embodiments. It should be understood that, the specific embodiments described herein are merely used to explain the present disclosure, but not intended to limit the present disclosure.

In the embodiments of the present invention, the amount of route information presented in an electronic map is expanded in a three-dimensional displaying manner, so as to comprehensively display detailed route information in the electronic map. Compared with a manner of displaying detailed route information by loading a new page or loading a floating window, the route information acquisition efficiency is effectively improved in the embodiments of the present invention.

Figure 1:
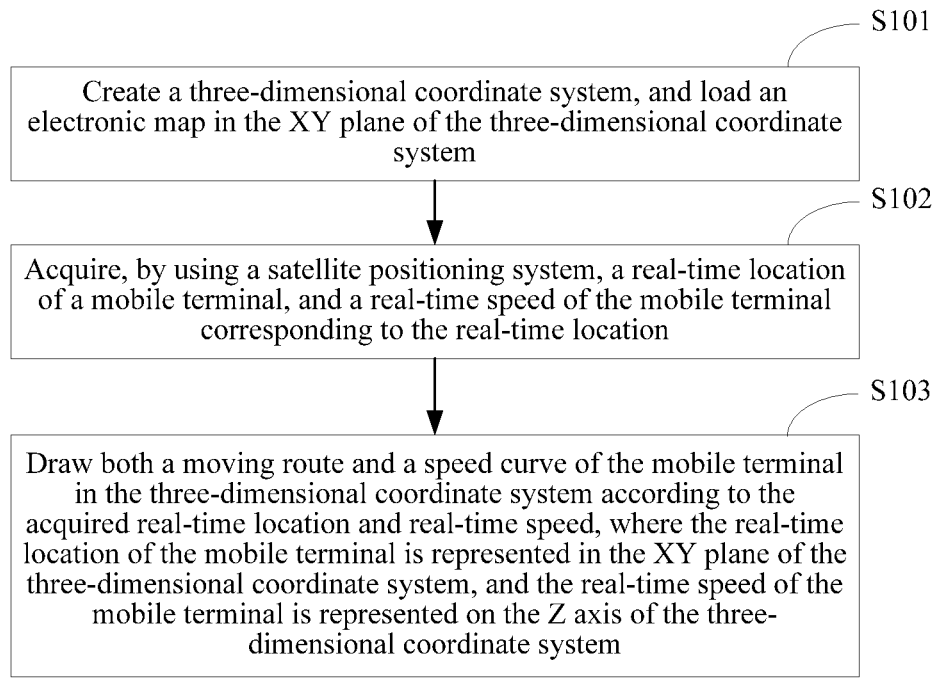
FIG. 1 is a flowchart of implementation of a route information displaying method according to an embodiment of the present invention.

FIG. 1 shows an implementation procedure of a route information displaying method according to an embodiment of the present invention. In this embodiment of the present invention, a route includes, but is not limited to, a route that a user passes through by walking, riding, driving, and the like while carrying a mobile terminal; and route information includes, but is not limited to, location information related to the route, information about a speed of travelling in the route, road speed limit information, road congestion information, and the like. The implementation procedure of FIG. 1 is described in detail as follows.

S101: Creating a three-dimensional coordinate system, and load an electronic map in the XY plane of the three-dimensional coordinate system.

In this embodiment, the three-dimensional coordinate system is created, so that the route information is displayed in a three-dimensional space displaying manner. In addition, after the three-dimensional coordinate system is created, the electronic map is loaded in the XY plane of the three-dimensional coordinate system, so that any location in the electronic map is represented by coordinates (x, y) in the XY plane or (x, y, a) in the three-dimensional coordinate system, where x and y are variables changing based on the real-time location, and a is a constant that can be pre-configured. In this case, the Z axis perpendicular to the XY plane is used to represent real-time speeds of the mobile terminal, and a value, on the Z axis, corresponding to the coordinates (x, y) can be used to represent a real-time speed of the mobile terminal when the mobile terminal passes through a location (x, y) in the electronic map.

S102: Acquiring, by using a satellite positioning system, a real-time location of a mobile terminal and a real-time speed of the mobile terminal corresponding to the real-time location.

The satellite positioning system includes, but is not limited to, the global positioning system (GPS) of America, the Galileo satellite positioning system of the European Union, the GLONASS system of Russia, and the BeiDou system of China.

In this embodiment, a signal receiver built in the mobile terminal is used to capture a tracked satellite signal to acquire related observation parameters of an observation point (namely, the mobile terminal); and a processor of the mobile terminal is further used to calculate the observation parameters to obtain information such as a longitude, a latitude, a height, a speed of a geographical location in which the mobile terminal is currently located, so as to acquire a current location of the mobile terminal and a real-time speed, of the mobile terminal, corresponding to the current location.

Figure 2A:
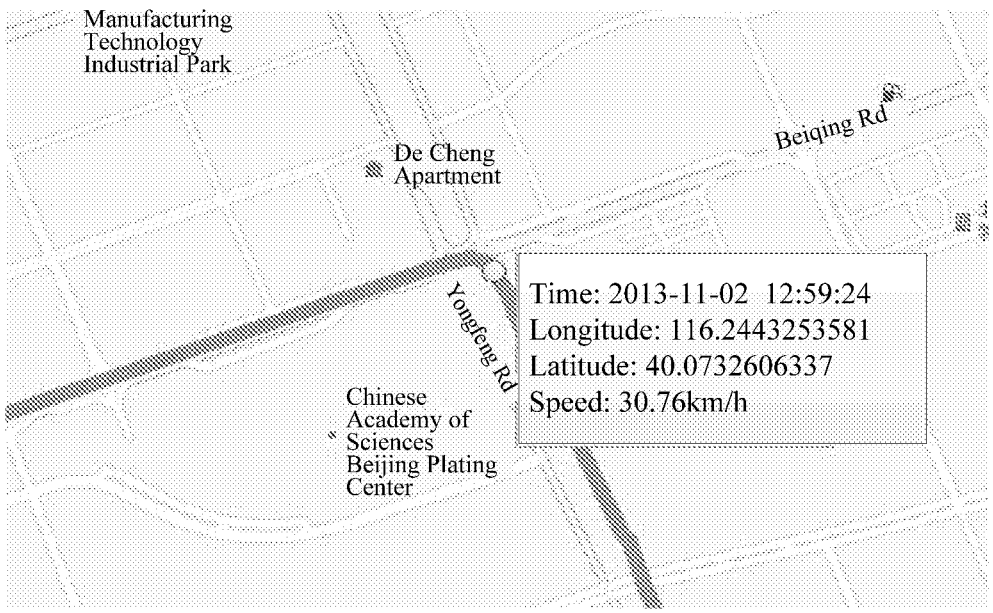
FIG. 2A and FIG. 2B are each an exemplary diagram of acquiring a real-time location and a real-time speed of a mobile terminal by using a satellite positioning system according to an embodiment of the present invention.
Figure 2B:
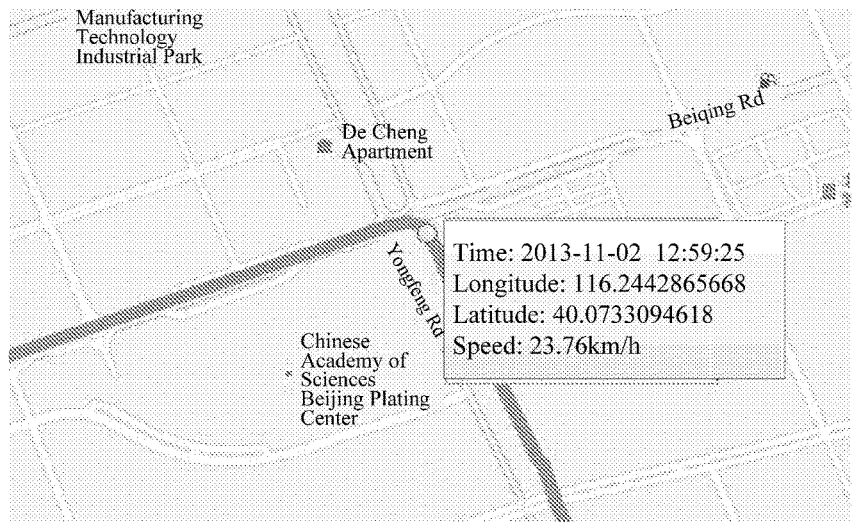

For example, the user drives from a location A (where a longitude is 116.3078667535, and a latitude is 39.9845898438) to a location B (where a longitude is 116.2170274523, and a latitude is 40.0772365994) at 12: 27: 17 on Nov. 2, 2013 while carrying a mobile terminal. In this case, as shown in FIG. 2A, when the user arrives at a location C at 12: 59: 24 on Nov. 2, 2013, the mobile terminal acquires a real-time location of the mobile terminal as follows: a longitude is 116.2443253581, a latitude is 40.0732606337, and a real-time speed corresponding to the real-time location is 30.76 km/h; and as shown in FIG. 2B, after 1 second, namely, at 12: 59: 25 on Nov. 2, 2013, the user arrives at a location D, and the mobile terminal acquires a real-time location of the mobile terminal as follows: a longitude is 116.2442865668, a latitude is 40.0733094618, and a real-time speed corresponding to the real-time location is 23.76 km/h. In this example, a real-time location and a real-time speed corresponding to the real-time location are associated with a same time point.

S103: Drawing both a moving route and a speed curve of the mobile terminal in the three-dimensional coordinate system according to the acquired real-time location and the acquired real-time speed, where the real-time location of the mobile terminal is represented in the XY plane of the three-dimensional coordinate system, and the real-time speed of the mobile terminal is represented on the Z axis of the three-dimensional coordinate system. In other words, coordinate (x, y, z) in the three-dimensional coordinate system may represent the real-time speed of the mobile terminal, where the values of variables x and y indicate the real-time location, and the value of variable z is proportional to the real-time speed corresponding to the real-time location. In some embodiments, the real-time speed may be represented by (x+m, y+n, z), where m and n are constants that can be predefined.

For the acquired real-time locations of the mobile terminal, position points are drawn at corresponding coordinate positions of the XY plane or a plane parallel with the XY plane according to longitude and latitude data representing the real-time locations, so as to draw the moving route of the mobile terminal in real time (e.g., by connecting neighboring data points of the real-time locations).

For the acquired real-time speeds, of the mobile terminal, corresponding to the real-time locations of the mobile terminal, drawing is performed one data point by one data point in the three-dimensional coordinate system created in S101, so as to draw a three-dimensional speed curve of the mobile terminal in real time (e.g., by connecting neighboring data points of the real-time locations), where the drawn speed curve and moving route have a one-to-one correspondence in each real-time location.

In specific implementation, the moving route and the speed curve of the mobile terminal may be separately drawn in different colors, and corresponding color block legends are used to separately indicate the colors for representing the moving route and the speed curve, so as to distinguish the moving route and the speed curve that appear in same display space in an intuitive and simple way, thereby improving the route information acquisition efficiency. In some embodiments, the Z-axis may be displayed on a side of the screen with legend marks indicating reference speeds (e.g. every 20 km/h from 20 to 140 km/h).

Further, a color in which each point in the speed curve is drawn may further be determined according to a value, of the point, on the Z axis. For example, when a real-time speed of the mobile terminal is greater than 60 km/h, a point corresponding to the real-time speed is drawn in red; and when a real-time speed of the mobile terminal is less than 10 km/h, a point corresponding to the real-time speed is drawn in blue. Different colors are used to indicate a speed change condition in the speed curve, which increases an information amount of displayed route information.

Figure 3:
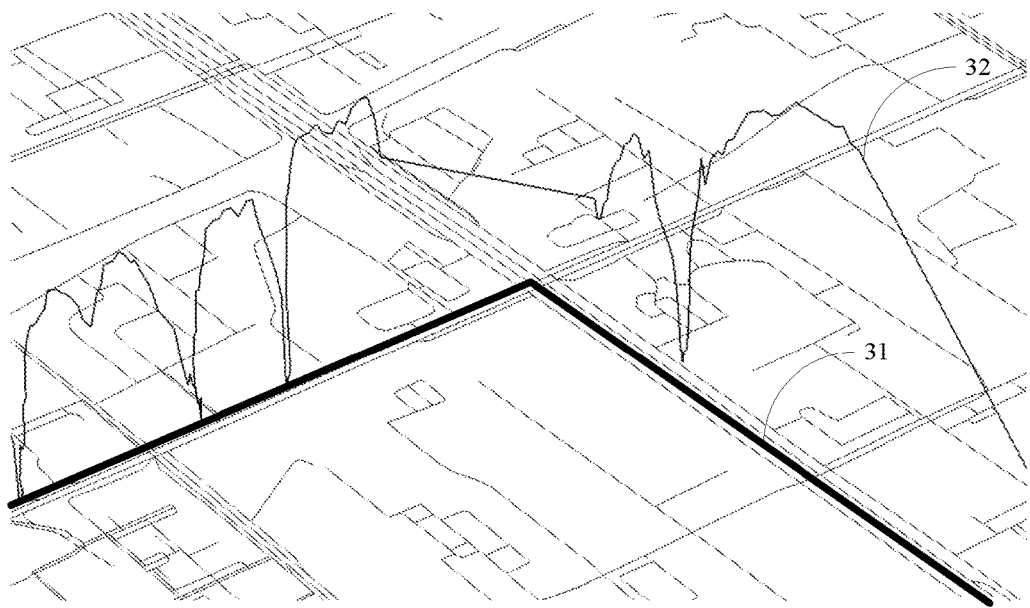
FIG. 3 is a schematic diagram of displaying route information in a route information displaying method according to an embodiment of the present invention.

Finally, by using the embodiment shown in FIG. 1, a schematic diagram of the route information displayed on the electronic map is shown in FIG. 3. It can be seen that by adding a dimension of route information display space, both a moving route 31 and a speed curve 32 of the mobile terminal can be displayed in a same display page; and route information display can be simply combined with the electronic map, so that display information of the electronic map itself is not covered as much as possible, thereby maximizing information capacity of the display page.

Figure 4:
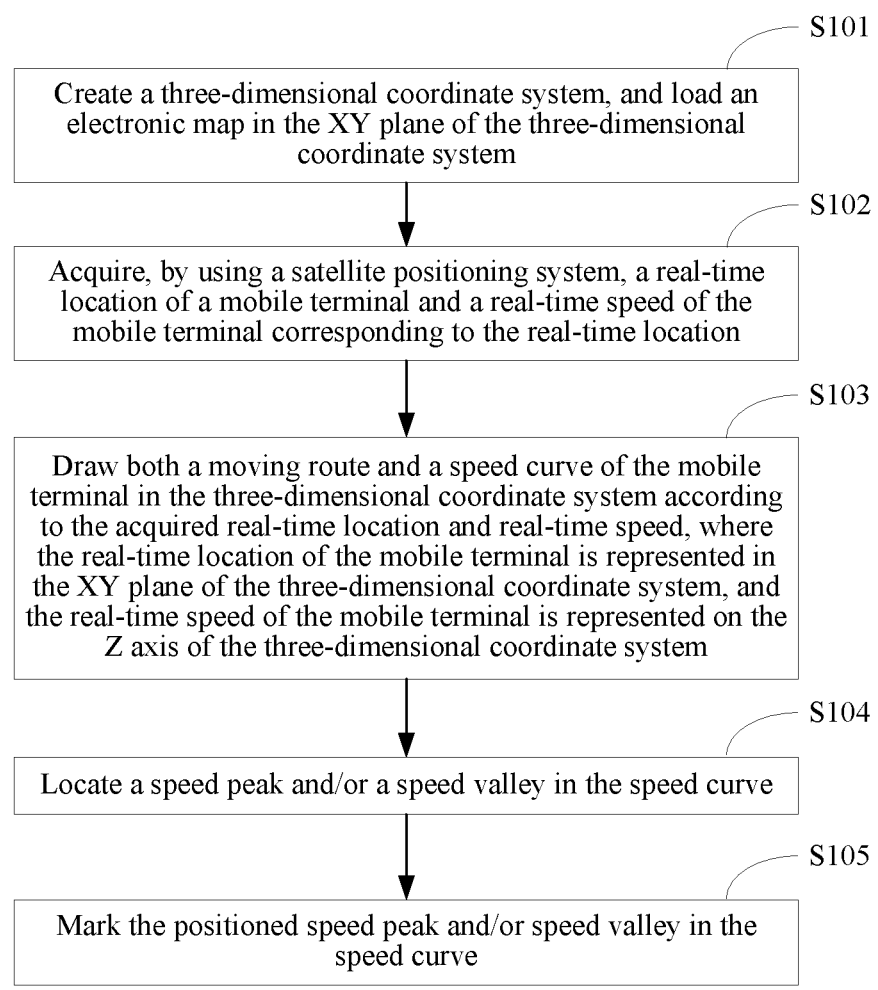
FIG. 4 is a flowchart of implementation of a route information displaying method according to another embodiment of the present invention.

Further, as an embodiment of the present invention, as shown in FIG. 4, after S103, the method may further include the following steps.

S104: Locating at least one of a speed peak and a speed valley in the speed curve.

The speed peak (namely, a maximum value of the real-time speed) and/or the speed valley (namely, a minimum value of the real-time speed) of the mobile terminal in a moving process may be located in the drawn speed curve according to the real-speed of the mobile terminal collected in real time in S102.

S105: Mark the located speed peak and/or speed valley in the speed curve.

Specifically, speed values of the speed peak and/or the speed valley may be marked by adding floating labels to positions at which the speed peak and/or the speed valley are located, or may also be marked by using drawn points of different shapes (for example, a circle and a triangle) or drawn points of highlighted colors at positions at which the speed peak and/or the speed valley are located. A specific marking manner herein is not intended to limit the present disclosure.

Figure 5:
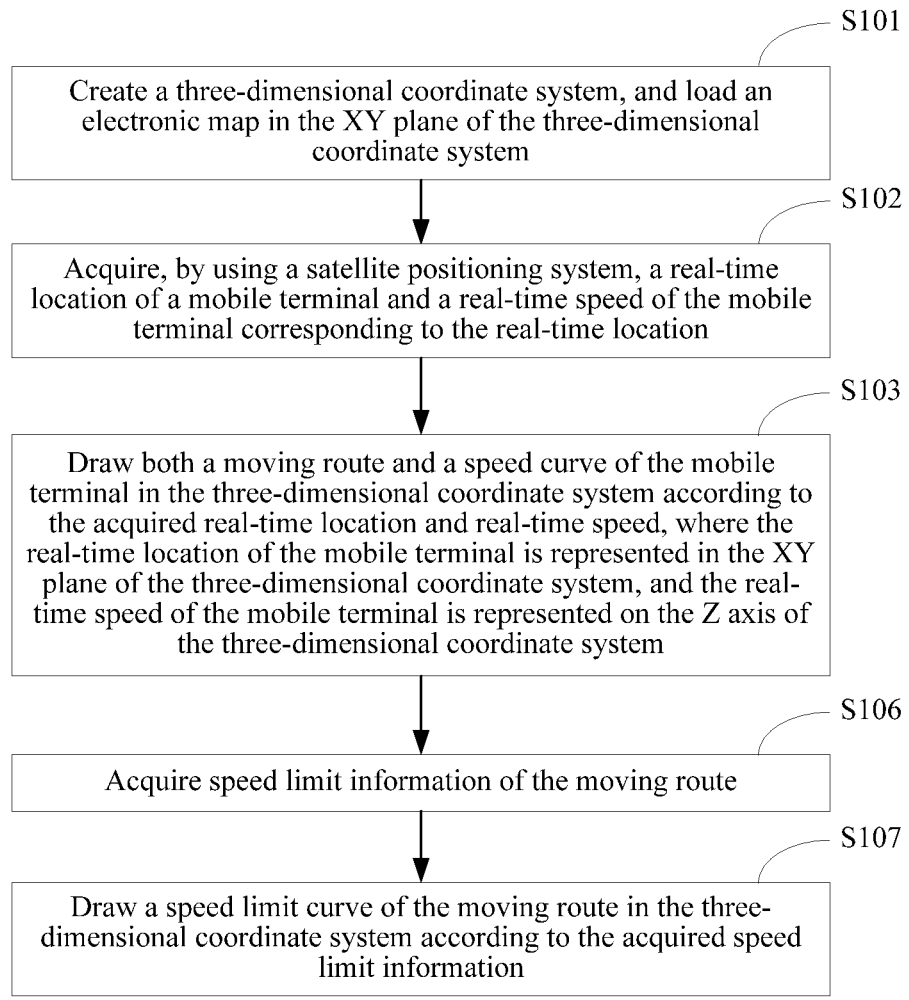
FIG. 5 is a flowchart of implementation of a route information displaying method according to another embodiment of the present invention.

Further, for an application scenario in which the route is a route that the user passes through by driving while carrying the mobile terminal, as an embodiment of the present invention, as shown in FIG. 5, after S103, the method may further include the following steps.

S106: Acquiring speed limit information of the moving route.

On a city road, an expressway, or a high-speed road, basically, each traffic road is provided with corresponding speed limit information. For example, a maximum driving speed allowed on a city high-speed road usually is not higher than 80 kilometers/hour and is not lower than 40 kilometers/hour, and a maximum driving speed allowed on an expressway usually is not higher than 120 kilometers/hour and is not lower than 80 kilometers/hour. Therefore, before S106, speed limit information of all traffic roads may be collected on-site or from a related information website of a traffic administration department in advance, and stored in a server; and when the moving route of the mobile terminal is determined, speed limit information of a traffic road matching the moving route is invoked and obtained by communicating with the server.

S107: Drawing a speed limit curve of the moving route in the three-dimensional coordinate system according to the acquired speed limit information.

In this embodiment, the speed limit curve of the moving route is drawn in the three-dimensional coordinate system according to the acquired speed limit information of the moving route based on the same method of drawing the speed curve in S103, and when a traffic administration department stipulates a maximum speed and a minimum speed allowed on a same road, drawn speed limit curves include a maximum speed limit curve and a minimum speed limit curve. Similarly, the speed limit curve may also be drawn in a different color to distinguish from the moving route and the speed curve of the mobile terminal.

Further, based on the embodiment shown in FIG. 5, by comparing a real-time speed corresponding to each real-time location and the speed limit information, a part in the speed curve which exceeds the speed limit curve is determined; and the part in the speed curve which exceeds the speed limit curve is marked.

That is, values of the speed curve and the speed limit curve, on the Z axis, in a same coordinate location on the XY plane of the three-dimensional coordinate system are compared; and if the value of the speed curve in the coordinate location is greater than the value of the speed limit curve in the coordinate location, this part of the speed curve is marked to confirm that in this segment of the moving route, a real-time speed of the mobile terminal exceeds a speed limit range of this segment of the moving route.

Similarly, an overspeed part in the speed curve may be marked by adding floating labels, or by using drawn points of different shapes (for example, a circle and a triangle) or drawn points of highlighted colors. A specific marking manner herein is not intended to limit the present disclosure.

In this embodiment, by marking the overspeed part in the speed curve, the user can quickly learn an overspeed road segment in a drive route of the user when viewing the route information; and whether overspeed occurs in the drive route is determined without querying a speed limit condition in a road segment and comparing speeds, which improves the route information acquisition efficiency.

Figure 6:
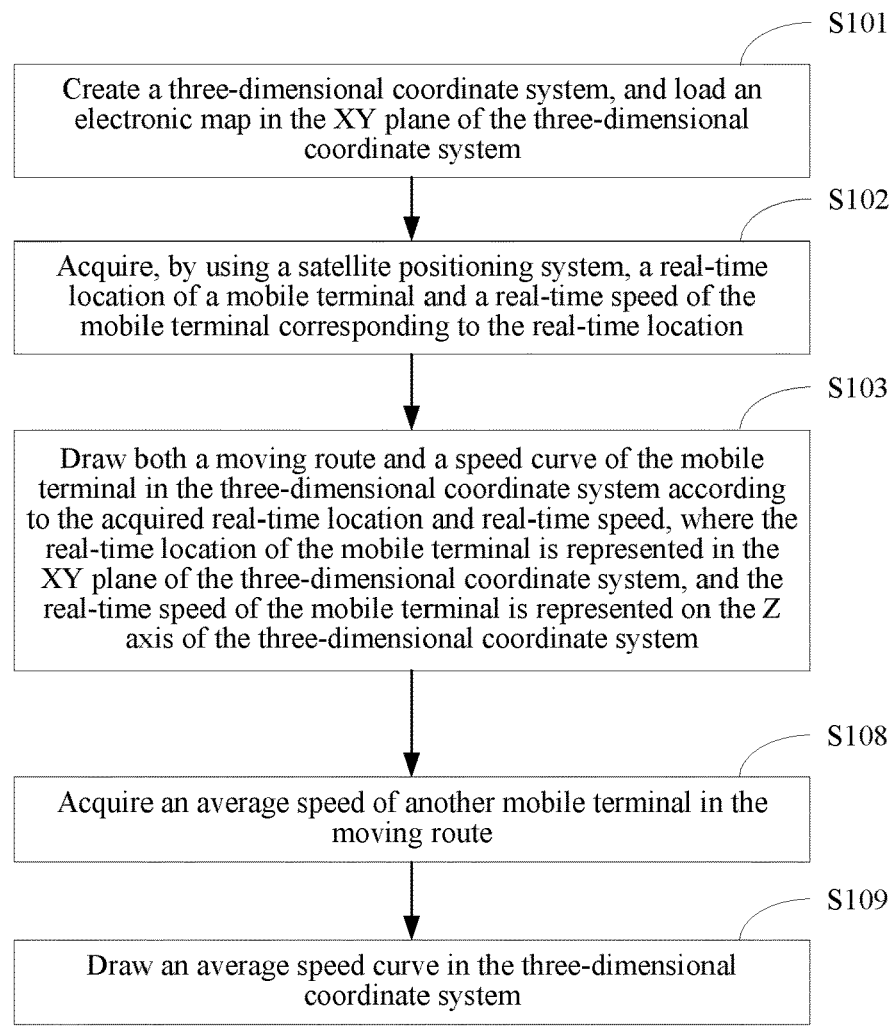
FIG. 6 is a flowchart of implementation of a route information displaying method according to another embodiment of the present invention.

Further, as an embodiment of the present invention, as shown in FIG. 6, after S103, the method may further include the following steps.

S108: Acquiring an average speed of other mobile terminals in the moving route.

In this embodiment, a related application client for displaying the route information can communicate with a background server of the related application client, and report acquired real-time speed information of a current mobile terminal in the moving route to the server. After collecting real-time speed data reported by multiple mobile terminals, the server calculates an average speed of the mobile terminals at each real-time location, and feeds back calculated average speed data to the application client.

S109: Drawing an average speed curve in the three-dimensional coordinate system.

According to the average speed data fed back by the server, the average speed curve is drawn in the three-dimensional coordinate system based on the same method of drawing the speed curve in S103. Similarly, the average speed curve may also be drawn in a different color to distinguish from the moving route and the speed curve of the mobile terminal.

Based on the embodiment of the present invention shown in FIG. 6, it can be known that the application client may also acquire an average speed of a specific mobile terminal in a same moving route by communicating with the background server or communicating with the specific mobile terminal. This function may be combined with a friend function of a network community; and in addition to acquiring an average traveling speed of multiple mobile terminals in the moving route in this manner, the user may also acquire a traveling speed, of a friend of the user in a network community, in this moving route. The foregoing route information is all displayed in an electronic map by using a three-dimensional curve; and in this way, simple combination with the electronic map is implemented, and display information of the electronic map itself is not covered as much as possible, thereby maximizing information capacity of a display page.

Figure 7:
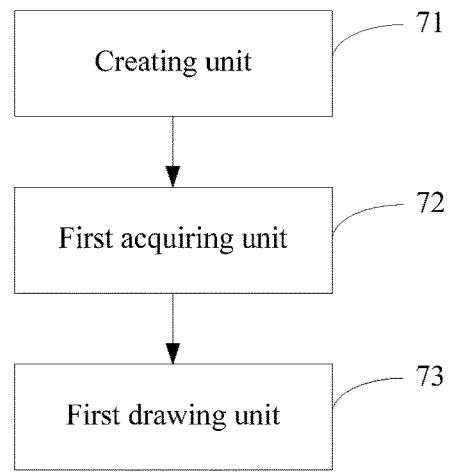
FIG. 7 is a structural block diagram of a route information displaying apparatus according to an embodiment of the present invention.

FIG. 7 shows a structural block diagram of a route information displaying apparatus according to an embodiment of the present invention. The apparatus may be located in a mobile terminal device such as a mobile phone, a tablet computer, or a vehicle-mounted terminal, and is configured to execute the route information displaying method described in the embodiments of FIG. 1 to FIG. 7 of the present disclosure. For ease of description, only a part related to this embodiment is shown.

Referring to FIG. 7, the apparatus includes: a creating unit 71, configured to create a three-dimensional coordinate system, and load an electronic map in the XY plane of the three-dimensional coordinate system; a first acquiring unit 72, configured to acquire, by using a satellite positioning system, a real-time location of a mobile terminal and a real-time speed, of the mobile terminal, corresponding to the real-time location; and a first drawing unit 73, configured to draw both a moving route and a speed curve of the mobile terminal in the three-dimensional coordinate system according to the acquired real-time location and real-time speed, where the real-time location of the mobile terminal is represented in the XY plane of the three-dimensional coordinate system, and the real-time speed of the mobile terminal is represented on the Z axis of the three-dimensional coordinate system.

Optionally, the apparatus further includes: a positioning unit, configured to position a speed peak and/or a speed valley in the speed curve; and a marking unit, configured to mark the positioned speed peak and/or speed valley in the speed curve.

Optionally, the apparatus further includes: a second acquiring unit, configured to acquire speed limit information of the moving route; and a second drawing unit, configured to draw a speed limit curve of the moving route in the three-dimensional coordinate system according to the acquired speed limit information.

Optionally, the apparatus further includes: a determining unit, configured to determine, by comparing a real-time speed corresponding to each real-time location and the speed limit information, a part, in the speed curve, which exceeds the speed limit curve; and a marking unit, configured to mark the part, in the speed curve, which exceeds the speed limit curve.

Optionally, the apparatus further includes: a third acquiring unit, configured to acquire an average speed of other mobile terminals in the moving route; and a third drawing unit, configured to draw an average speed curve in the three-dimensional coordinate system. A processor of the apparatus may implement the configured functions of the various units of the apparatus.

Figure 8:
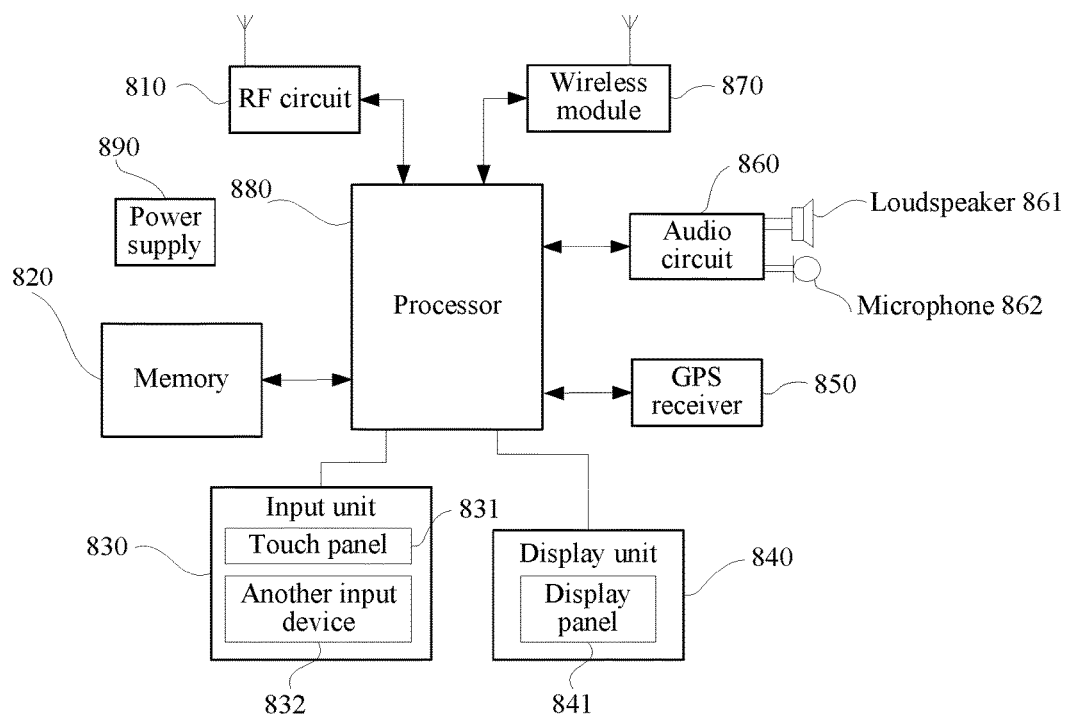
FIG. 8 is a block diagram of the structure of a part of a mobile phone related to a terminal according to an embodiment of the present invention.

FIG. 8 shows a block diagram of the structure of a part of a mobile phone related to a terminal according to an embodiment of the present invention. Referring to FIG. 8, the mobile phone includes components such as a radio frequency (RF) circuit 810, a memory 820, an input unit 830, a display unit 840, a GPS receiver 850, an audio circuit 860, a wireless module 870, a processor 880, a power supply 890. A person skilled in the art may understand that the structure of the mobile phone shown in FIG. 8 does not does not constitute a limitation to the mobile phone, and the mobile phone may include more components or fewer components than those shown in the figure, or some components may be combined, or a different component deployment may be used.

The following specifically describes the components of the mobile phone with reference to FIG. 8.

The RF circuit 810 may be configured to receive and send signals during an information receiving and sending process or a call process. Particularly, the RF circuit 810 receives downlink information from a base station, then delivers the downlink information to the processor 880 for processing, and sends related uplink data to the base station. Generally, the RF circuit includes, but is not limited to, an antenna, at least one amplifier, a transceiver, a coupler, a low noise amplifier (LNA), and a duplexer. In addition, the RF circuit 810 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 820 may be configured to store a software program and module. The processor 880 runs the software program and module stored in the memory 820, to implement various functional applications and data processing of the mobile phone. The memory 820 may mainly include a program storage area and a data storage area. The program storage area may store an operating system, an application program required by at least one function (such as a sound playback function and an image display function), and the like. The data storage area may store data (such as audio data and an address book) created according to use of the mobile phone, and the like. In addition, the memory 820 may include a high speed random access memory, and may also include a non-volatile memory such as at least one magnetic disk storage device, a flash memory, or another volatile solid-state storage device.

The input unit 830 may be configured to receive input digit or character information, and generate a keyboard signal input related to the user setting and function control of the mobile phone 800. Specifically, the input unit 830 may include a touch panel 831 and another input device 832. The touch panel 831, which may also be referred to as a touch screen, may collect a touch operation of a user on or near the touch panel (such as an operation of a user on or near the touch panel 831 by using any suitable object or accessory such as a finger or a stylus), and drive a corresponding connection apparatus according to a preset program. Optionally, the touch panel 831 may include two parts: a touch detection apparatus and a touch controller. The touch detection apparatus detects a touch position of the user, detects a signal generated by the touch operation, and transfers the signal to the touch controller. The touch controller receives the touch signal from the touch detection apparatus, converts the touch signal into touch point coordinates, and sends the touch point coordinates to the processor 880. Moreover, the touch controller can receive and execute a command sent from the processor 880. In addition, the touch panel 831 may be a resistive, capacitive, infrared, or surface sound wave type touch panel. In addition to the touch panel 831, the input unit 830 may further include the another input device 832. Specifically, the another input device 832 may include, but is not limited to, one or more of a physical keyboard, a functional key (such as a volume control key or a switch key), a track ball, a mouse, and a joystick.

The display unit 840 may be configured to display information input by the user or information provided for the user, and various menus of the mobile phone. The display unit 840 may include a display panel 841. Optionally, the display panel 841 may be configured by using a liquid crystal display (LCD), an organic light-emitting diode (OLED), or the like. Further, the touch panel 831 may cover the display panel 841. After detecting a touch operation on or near the touch panel 831, the touch panel 831 transfers the touch operation to the processor 880, so as to determine the type of the touch event. Then, the processor 880 provides corresponding visual output on the display panel 841 according to the type of the touch event. Although, in FIG. 8, the touch panel 831 and the display panel 841 are used as two separate parts to implement input and output functions of the mobile phone, in some embodiments, the touch panel 831 and the display panel 841 may be integrated to implement the input and output functions of the mobile phone.

The mobile phone 800 may further include the GPS receiver 850 for receiving a GPS system satellite signal and determining a ground space location. Specifically, the GPS receiver 850 is mainly configured for navigation for a moving entity, and may provide a location and a speed of the entity in real time. Depending on different application fields, the GPS receiver 850 may further be vehicle-mounted, and adapts to a normal vehicle traveling speed and is specially configured for vehicle navigation and positioning.

The audio circuit 860, a loudspeaker 861, and a microphone 862 may provide audio interfaces between the user and the mobile phone. The audio circuit 860 may convert received audio data into an electric signal and transmit the electric signal to the loudspeaker 861. The loudspeaker 861 converts the electric signal into a sound signal for output. On the other hand, the microphone 862 converts a collected sound signal into an electric signal. The audio circuit 860 receives the electric signal and converts the electric signal into audio data, and outputs the audio data to the processor 880 for processing. Then, the processor 880 sends the audio data to, for example, another mobile phone by using the RF circuit 810, or outputs the audio data to the memory 820 for further processing.

The wireless module is based on a short distance wireless transmission technology. The mobile phone may help, by using the wireless module 870, the user to receive and send e-mails, browse a webpage, access streaming media, and so on, which provides wireless broadband Internet access for the user. Although FIG. 8 shows the wireless module 870, it may be understood that the wireless module is not a necessary component of the mobile phone 800, and when required, the wireless module may be omitted as long as the scope of the essence of the present disclosure is not changed.

The processor 880 is the control center of the mobile phone, and is connected to various parts of the mobile phone by using various interfaces and lines. By running or executing the software program and/or module stored in the memory 820, and invoking data stored in the memory 820, the processor 880 performs various functions and data processing of the mobile phone, thereby performing overall monitoring on the mobile phone. Optionally, the processor 880 may include one or more processing units. Preferably, the processor 880 may integrate an application processor and a modem. The application processor mainly processes an operating system, a user interface, an application program, and the like. The modem mainly processes wireless communication. It may be understood that the foregoing modem may also not be integrated into the processor 880.

The mobile phone 800 further includes the power supply 890 (such as a battery) for supplying power to the components. Preferably, the power supply may be logically connected to the processor 880 by using a power management system, thereby implementing functions such as charging, discharging and power consumption management by using the power management system.

Although not shown in the figure, the mobile phone 800 may further include a camera, a Bluetooth module, and the like, which are not further described herein.

In the embodiments of the present invention, the processor 880 included in the terminal further has the following functions: implementing a route information displaying method, including: generating a three-dimensional coordinate system, and loading an electronic map in the XY plane of the three-dimensional coordinate system; acquiring, by using a satellite positioning system, a real-time location of a mobile terminal and a real-time speed of the mobile terminal corresponding to the real-time location; and drawing both a moving route and a speed curve of the mobile terminal in the three-dimensional coordinate system according to the acquired real-time location and real-time speed, where the real-time location of the mobile terminal is represented in the XY plane of the three-dimensional coordinate system, and the real-time speed of the mobile terminal is represented on the Z axis of the three-dimensional coordinate system.

Further, the method further includes: positioning a speed peak and/or a speed valley in the speed curve; and marking the positioned speed peak and/or speed valley in the speed curve.

Further, the method further includes: acquiring speed limit information of the moving route; and drawing a speed limit curve of the moving route in the three-dimensional coordinate system according to the acquired speed limit information.

Further, the method further includes: determining, by comparing a real-time speed corresponding to each real-time location and the speed limit information, a part, in the speed curve, which exceeds the speed limit curve; and marking the part, in the speed curve, which exceeds the speed limit curve.

Further, the method further includes: acquiring an average speed of other mobile terminals in the moving route; and drawing an average speed curve in the three-dimensional coordinate system.

In an exemplary embodiment, the mobile phone 800 may install an application for implementing the disclosed method. The application may be a map application or a navigation application. The drawing steps of the disclosed method may be displayed in a user interface of the application in real time. That is, the display unit 840 may update the speed curve, the moving route, and other related route information periodically (e.g., every two seconds) or along with the movement of the mobile phone (e.g., every 5 meters). Further, the application may have default settings on how to display route information, and may allow the user to choose display preferences in a configuration interface, such as selecting types of information that the user would like to be displayed (e.g., speed curve, speed peak on the speed curve, speed valley on the speed curve, overspeed part on the speed curve, speed limit curve, average speed curve, speed curve of another terminal), and choosing how to display the selected types of information (e.g., color options, transparency degree options, shape options).

In some embodiments, the application may integrate social functions. For example, the application may receive a route of a user's friend and display route information of the friend when the user is moving in a same or nearby area of the route.

The mobile phone 800 may further communicate with a background server to obtain route information, such as speed limit information, average speed information, route information of a friend account, etc. The background server may include at least a storage medium, a communication module, and a processor for responding to requests from the mobile phone 800.

In some embodiments, the application may present historical route information to the user in the disclosed three-dimensional display manner. For example, the user may choose a specific time period or a specific area in the application. The mobile phone 800 may obtain information about the locations and the speeds corresponding to the specific time period or the specific area from the local storage or from the background server. According to the obtained information, the disclosed method may be implemented by the processor 880 to present the moving route, the speed curve and other related information of the specific time period or specific area.

In the embodiments of the present invention, a displayed information amount of route information in an electronic map is expanded in a three-dimensional space displaying manner, so as to comprehensively display detailed route information in the electronic map. Compared with a manner of displaying detailed route information by loading a new page or loading a floating window, the route information acquisition efficiency is effectively improved in the embodiments of the present invention.

The foregoing descriptions are merely preferred embodiments of the present invention, but are not intended to limit the present disclosure. Any modification, equivalent replacement, and improvement made within the spirit and principle of the present disclosure shall fall within the protection scope of the present disclosure.

What is claimed is:

1. A route information displaying method, comprising:
generating a three-dimensional coordinate system, and loading an electronic map in the XY plane of the three-dimensional coordinate system;
acquiring a real-time location of a mobile terminal, and a real-time speed of the mobile terminal corresponding to the real-time location; and
drawing a speed curve of the mobile terminal in the three-dimensional coordinate system according to the real-time location and the real-time speed, the real-time location of the mobile terminal being represented in the XY plane of the three-dimensional coordinate system, and the real-time speed of the mobile terminal being represented on the Z axis of the three-dimensional coordinate system.

2. The method according to claim 1, further comprising:
locating at least one of a speed peak or a speed valley in the speed curve; and
marking the at least one of the speed peak or the speed valley in the speed curve.

3. The method according to claim 1, further comprising:
acquiring speed limit information of a moving route of the mobile terminal.

4. The method according to claim 3, further comprising:
drawing a speed limit curve of the moving route in the three-dimensional coordinate system according to the acquired speed limit information.

5. The method according to claim 3, further comprising:
determining, by comparing a real-time speed corresponding to each real-time location and the speed limit information, a part in the speed curve which exceeds the speed limit curve; and
marking the part in the speed curve which exceeds the speed limit curve.

6. The method according to claim 1, further comprising:
acquiring an average speed of other mobile terminals in the moving route; and
drawing an average speed curve in the three-dimensional coordinate system.

7. A route information displaying apparatus, comprising:
a memory; and
a processor coupled to the memory, wherein the processor is configured to perform:
generating a three-dimensional coordinate system, and loading an electronic map in the XY plane of the three-dimensional coordinate system;
acquiring a real-time location of a mobile terminal, and a real-time speed of the mobile terminal corresponding to the real-time location; and
drawing a speed curve of the mobile terminal in the three-dimensional coordinate system according to the real-time location and the real-time speed, the real-time location of the mobile terminal being represented in the XY plane of the three-dimensional coordinate system, and the real-time speed of the mobile terminal being represented on the Z axis of the three-dimensional coordinate system.

8. The apparatus according to claim 7, wherein the processor is further configured to perform:
locating at least one of a speed peak or a speed valley in the speed curve; and
marking the at least one of the speed peak or the speed valley in the speed curve.

9. The apparatus according to claim 7, wherein the processor is further configured to perform:
acquiring speed limit information of a moving route of the mobile terminal.

10. The apparatus according to claim 9, wherein the processor is further configured to perform:
drawing a speed limit curve of the moving route in the three-dimensional coordinate system according to the acquired speed limit information.

11. The apparatus according to claim 9, wherein the processor is further configured to perform:
determining, by comparing a real-time speed corresponding to each real-time location and the speed limit information, a part in the speed curve which exceeds the speed limit curve; and
marking the part in the speed curve which exceeds the speed limit curve.

12. The apparatus according to claim 7, wherein the processor is further configured to perform:
acquiring an average speed of other mobile terminals in the moving route; and
drawing an average speed curve in the three-dimensional coordinate system.

13. A non-transitory computer-readable storage medium storing a computer-executable program that, when being executed by a processor of a first terminal, implementing a route information displaying method, the method comprising:
generating a three-dimensional coordinate system, and loading an electronic map in the XY plane of the three-dimensional coordinate system;
acquiring a real-time location of a mobile terminal, and a real-time speed of the mobile terminal corresponding to the real-time location; and
drawing a speed curve of the mobile terminal in the three-dimensional coordinate system according to the real-time location and the real-time speed, the real-time location of the mobile terminal being represented in the XY plane of the three-dimensional coordinate system, and the real-time speed of the mobile terminal being represented on the Z axis of the three-dimensional coordinate system.

14. The storage medium according to claim 13, wherein the method further comprises:

locating at least one of a speed peak or a speed valley in the speed curve; and marking the at least one of the speed peak or the speed valley in the speed curve.

15. The storage medium according to claim 13, wherein the method further comprises:

acquiring speed limit information of a moving route of the mobile terminal.

16. The storage medium according to claim 15, wherein the method further comprises:

drawing a speed limit curve of the moving route in the three-dimensional coordinate system according to the acquired speed limit information.

17. The storage medium according to claim 15, wherein the method further comprises:

determining, by comparing a real-time speed corresponding to each real-time location and the speed limit information, a part in the speed curve which exceeds the speed limit curve; and marking the part in the speed curve which exceeds the speed limit curve.

18. The storage medium according to claim 13, wherein the method further comprises:

acquiring an average speed of other mobile terminals in the moving route; and drawing an average speed curve in the three-dimensional coordinate system.

\* \* \* \* \*